United States Patent [19]

Leason

[11] 4,113,627
[45] Sep. 12, 1978

[54] PROCESS FOR MAKING HERMETICALLY SEALED FILTER UNITS AND FILTERS MADE THEREBY

[75] Inventor: Hayden L. Leason, Humacao, P.R.

[73] Assignee: Filtertek, Inc., Hebron, Ill.

[21] Appl. No.: 798,644

[22] Filed: May 19, 1977

Related U.S. Application Data

[63] Continuation-in-part of Ser. No. 653,012, Jan. 28, 1976, abandoned, which is a continuation-in-part of Ser. No. 548,544, Feb. 10, 1975, abandoned.

[51] Int. Cl.² ............................................. B01D 25/00
[52] U.S. Cl. ............................... 210/446; 128/214 R; 264/251; 264/255; 264/257; 264/273; 264/DIG. 48
[58] Field of Search ............... 210/435, 445, 446, 448, 210/451, 453, 456; 55/159, 502, 511; 128/214 R; 264/250, 251, 252, 255, 257, 294, 273, DIG. 48

[56] References Cited

U.S. PATENT DOCUMENTS

| | | | |
|---|---|---|---|
| 3,148,233 | 9/1964 | Gits | 264/250 X |
| 3,397,518 | 8/1968 | Rogers | 55/502 X |
| 3,782,083 | 1/1974 | Rosenberg | 210/445 X |
| 3,803,810 | 4/1974 | Rosenberg | 55/159 |
| 3,897,342 | 7/1975 | Schmid et al. | 210/445 |
| 3,954,625 | 5/1976 | Michalski | 210/445 |

Primary Examiner—William A. Cuchlinski, Jr.
Attorney, Agent, or Firm—Hume, Clement, Brinks, Willian & Olds, Ltd.

[57] ABSTRACT

A process for the manufacture of intravenous solution filter units includes injection molding a sealing member onto the periphery of the assembled filter components to hermetically seal the components into an integral assembly. The filter unit itself includes a housing and a filter element disposed internally thereof. The filter element is supported by a grid having a design and placement within the housing to assure, in conjunction with other structural features of the filter, the complete purging of gases from the filtrate. Also disclosed is a method for hermetically sealing the filter element to its thermoplastic support which provides an improved seal which will not leak. This method comprises the molding of the support, the alignment of the filter element on the support, the application of pressure to hold the element on the support and the overmolding of the periphery of the element to seal the edge of the element to the support.

13 Claims, 16 Drawing Figures

PROCESS FOR MAKING HERMETICALLY SEALED FILTER UNITS AND FILTERS MADE THEREBY

CROSS REFERENCE TO RELATED APPLICATIONS

This application is a continuation-in-part of copending U.S. patent application Ser. No. 653,012, filed Jan. 28, 1976, now abandoned, which in turn is a continuation-in-part of application Ser. No. 548,544, filed Feb. 10, 1975, now abandoned.

BACKGROUND OF THE INVENTION

The present invention relates to a process for making hermetically sealed filter units; in particular, to a process for molding a porous filter element to a thermoplastic support to insure an integral seal. The present invention also relates generally to hermetically sealed filter units and, more specifically, to such filters which are used to remove bacteria and other minute contaminants from a fluid stream and which include a novel arrangement of structural features to improve both their function and utility.

Molded plastic filters and filter units are well-known and enjoy a wide use and general acceptance in a variety of industries. The function of such units is to remove contaminants from liquid or gaseous materials which flow there through. One important application of such filter units is to remove bacteria, gases and other contaminants from solutions being introduced into the human bloodstream. In critical applications of this nature, it is imperative that the filter media not be damaged and that the filtrate not by-pass the filtering medium, for either situation would allow contaminants to enter the bloodstream. It is necessary, therefore, that an undamaged, hermetic seal exist to prevent leakage around the filter element and also to prevent possible bacterial contamination from outside the assembly.

Another important function of such filter units is to purge the air or other gases which may be entrapped in the solution. Thus, filters used to purify intravenous solutions must provide some mechanism for venting such entrapped air from the upstream side of the filter media while maintaining the hermetic seal of the media. Similarly, the filter unit must be constructed to assure the complete removal of any entrapped gases at the entry side of the filter element prior to introduction of the filtrate into the human bloodstream.

Typically, the filter units used to filter intravenous solutions comprise a two-part housing and an internally disposed filter sandwiched there between.

Several methods of sealing the filter elements have been employed in the past. These methods include pressure clamping, heat sealing, ultrasonic welding, and adhesive and solvent bonding. These prior art methods, however, may fail to provide, on occassion, the one hundred percent positive seal which is necessary to prevent the leakages described above. Moreover, in critical applications where special microporous membranes are used, there is some danger when using these prior art methods that delicate filter media or thin plastic sealing flanges will be damaged during the sealing process.

Pressure clamping and other mechanical interlocking systems may distort the filter media or actually damage the filter media at the clamping edges, thereby destroying the integrity of the filter media and allowing contaminants to pass through. Also, many conditions such as time, and heat stress relieving can allow the pressure seal to relax and allow contaminants to by-pass the filter media.

Heat sealing, sonic welding and related thermomechanical bonding methods may also damage the filter medium and are suspect to reliability especially when the filter unit has an uneven, irregular or unsymetrical shape.

The use of adhesives or solvent bonding has disadvantages in that another material is introduced that can lead to contamination on its own. Often the constituents of an adhesive or solvent system may be damaging to the microporous membrane.

Thus, there is a need for a new process which will provide a completely hermetic seal for plastic molded filter units and which will insure that the filter medium is completely sealed to the filter housing without any damage to the structural integrity of even the most delicate components.

In addition, since the filter media utilized in such filter units may be quite delicate, it is desirable to provide support to this element on the downstream or low pressure side. Such supportive structures used in prior art devices, while generally acceptable, tend to obstruct the fluid flow passageway on the downstream side of the filter media which obstruction, in turn, results in the entrapment of small gas bubbles which are sometimes difficult to purge. There is a need, therefore, for a filter unit which avoids these structural shortcomings found in prior art devices and which thereby assures the expeditious and complete purging of downstream gases from the filter unit prior to filtrate use.

SUMMARY OF THE INVENTION

Accordingly, the present invention is directed toward a process for manufacturing a hermetically sealed filter unit which will insure that all the filtrate flowing from the unit has in fact passed through the filter medium and which will eliminate entirely the danger of filtrate contamination by foreign materials such as bacteria, gases and the like through imperfect seals.

Generally, the process of the present invention comprises the steps of molding a thermoplastic filter support element which has the filtrate passing aperture formed therein, aligning the filter element over the aperture and the adjacent surface portions of the support, applying pressure to the filter element near its edge to hold the element against the support, and then injection molding a compatable thermoplastic overmold over the edges of the filter element and the adjacent surface portions of the support to capture the edge of the filter element against the support and to form the integral seal between the support and the filter element. Preferably, a common mold half is used both to mold the filter support and during the overmolding step so that the support will not have to be transferred to a separate mold. This filter element-filter support unit may then be sealed into a filter housing by a variety of methods without the danger of damaging the filter element.

In another embodiment of the invention, the novel process described above is used to mold the filter media for the filter unit's venting apertures to the housing component in which such apertures are mounted.

The present invention is also directed to novel filter units which incorporate sealed filter elements made in accordance with the process of the invention.

BRIEF DESCRIPTION OF THE DRAWINGS

The novel features which are believed to be characteristic of the present invention are set forth in the appended claims. The invention itself, however, together with further objects and attendant advantages thereof, will be best understood by reference to the following description, taken in connection with the accompanying drawings, in which:

DETAILED DESCRIPTION OF THE INVENTION

The process of this invention is best described below with respect to the embodiments illustrated in FIGS. 12 through 15.

The filter units described below and shown in the drawings are particularly suited for use in filtering intravenous solutions prior to introduction into a person's bloodstream. Although intravenous solutions are easily sterilized, they normally contain particulate matter and other foreign material which may cause serious problems if injected into the bloodstream. The filter unit of the present invention is particularly suited for removing such foreign material from intravenous solutions just before it enters the vein.

The description of the preferred embodiments of the present invention set forth hereinafter is made with reference to such an intravenous filter unit. However, it is to be understood that the novel process and the filter unit described herein may be used in other applications where their particular features are found to be desirable. Thus, the present invention may be utilized to manufacture any type of plastic molded filter unit wherein one hundred percent sealing is essential or desirable.

Figure 1:
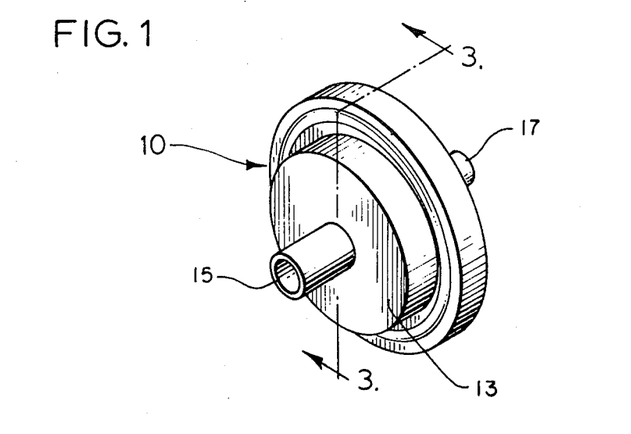
FIG. 1 is a perspective view showing an intravenous solution filter element.
Figure 2:
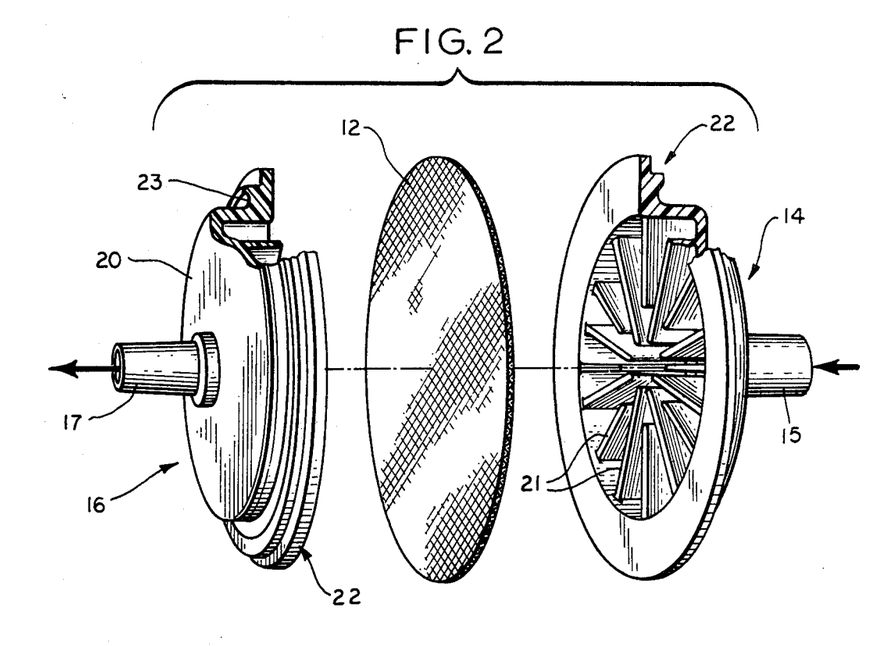
FIG. 2 is an exploded perspective view of the component parts of the filter unit shown in FIG. 1 prior to application of the injection molded sealing member thereon.

Referring now to FIGS. 1 and 2, an intravenous solution filter unit 10 is shown, in which the filter is sealed by pressure clamping the filter between the two halves of the filter unit and then injection molding a sealing member around the periphery of the filter unit. Filter unit 10 includes a filter element 12 disposed internally of a housing 13 with inlet and outlet openings 15 and 17, respectively, which is constructed of two parts, 14 and 16 respectively. These parts are assembled and fused or bonded into an integral filter unit by means of an injection molded sealing member 18.

The filter element 12 may be constructed of any one of a number of materials and designs well known in the art. Likewise, the pore size of the filter element will be determined by the particular application in which the filter element is to be used. For example, in intravenous applications the filter element may be a porous membrane constructed from nylon, cellulose esters, or other equivalent stable and inert materials. The pore size may range from 0.1 to 15 microns. A wide variety of such filter elements are available, and these are well known to those skilled in the art.

The housing 13 used in conjunction with the intravenous filter element described above is formed of at least two parts of thermoplastic material, 14 and 16 respectively. Each housing part has a central recessed portion 20 surrounded by an outer portion 22. The thermoplastic material used in the construction of housing 13 may be chosen from a wide variety of plastics which are well known in the art, such as cellulose propionate, nylon, polyester, polypropelene, ABS, polyethylene, and vinyl among others. One or both of the housing parts may also include a plurality of radially extended ribs 21 which are disposed inwardly of the outer portion 22. These ribs provide additional strength to the housing and also act as a support for the filter element 12.

During the assembly of the filter unit, the housing parts 14 and 16 are aligned on opposite sides of the filter element 12 such that the outer portions 22 thereof oppose one another and align with a peripheral portion of the filter element 12. Next, a force is applied to the external surfaces of the housing parts so as to engage the outer portions 22 thereof with the opposite sides of the peripheral portions of the filter element 12. In this manner a joint 24 is formed around the entire periphery of the filter unit. Having assembled the housing parts and filter element in this manner, a sealing member 18 composed of a compatible thermoplastic material is injection molded so as to completely surround and fill joint 24 and form thereby an integral part of the filter unit.

Figure 5:
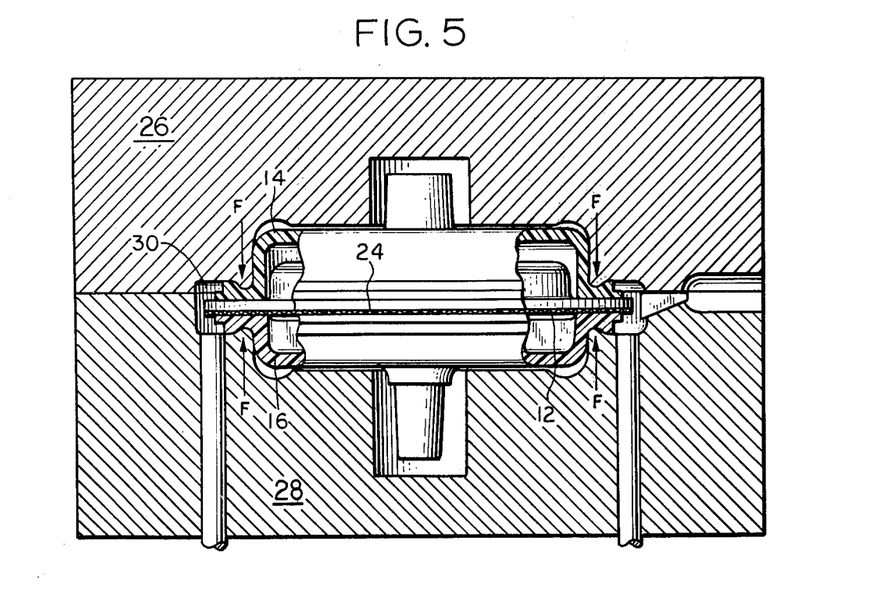
FIG. 5 is a cross-sectional view showing the component parts as illustrated in FIG. 2 in assembled relation within a mold.

The assembly process may be most expeditiously carried out through the use of an injection molding machine. A typical mold and mold cavity used in such a machine is illustrated in FIG. 5. Thus, the second housing part 16, the filter element 12, and the first housing part 14 are placed in the mold cavity which is subsequently closed thereby forming an injection molding cavity 30. The forces exerted by the mold halves 26 and 28 are concentrated on the outer portions 22 of the housing parts as illustrated by the arrows F, thereby insuring that the individual components are engaged at joint 24 along the entire periphery of the filter unit. Preferably, the housing parts also include a peripheral recess 23 which is positioned on the external surface of the outer portions 22. This recess cooperates with the mold halves 26 and 28 to prevent lateral movement of the components thereby insuring stability while the sealing member 18 is being formed.

The sealing member 18 is formed by injecting into cavity 30 a compatible thermoplastic resin. Of course, the particular parameters and processing procedures utilized in such an injection molding process may vary depending on the material and equipment, and these are well-known in the art. For example, where the housing parts and sealing member are composed of an ABS thermoplastic resin, and injection temperature will be in the range of about 450° F. and the injection pressure will be approximately 1500 psi.

Figure 3:
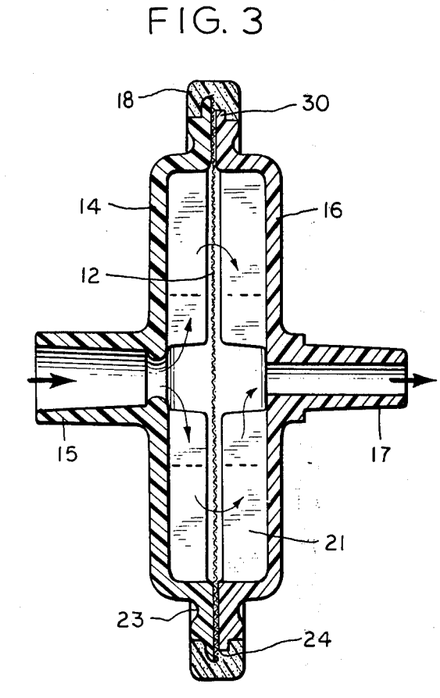
FIG. 3 is an enlarged cross-sectional view of the filter unit of FIG. 1 taken along line 3—3 of FIG. 1.

In order to take advantage of this dual sealing mechanism the housing parts 14 and 16 are provided with an outer portion 22 having an outer flange which includes a stepped, cross-sectional configuration. It is particularly preferred that one of the housing parts have a shortened exterior lip 30 such that at least a part of the lateral surface of filter element 12 will be directly exposed to the thermoplastic sealing member 18. This arrangement is clearly shown in FIG. 3 of the drawing.

Figure 4:
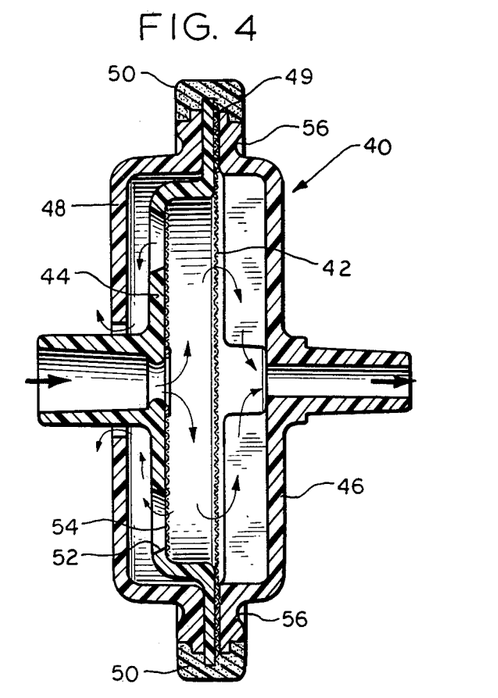
FIG. 4 is a cross-sectional view similar to that shown in FIG. 3 of a slightly modified filter element.

An alternative filter unit 40 is illustrated in FIG. 4. This unit shows a filter unit having more than the conventional three-piece assembly. The unit 40 includes a filter element 42, a first housing part 44, a second housing part 46 and a third housing part 48. These components are assembled as illustrated in the drawing, again forming a peripheral joint 49. A sealing member 50 is then injection molded around the entire periphery of the unit, forming a hermetic seal at joint 49 and an integral unit with the assembled components.

Filter unit 40 provides the addition feature of venting the inlet side of the assembly in order to prevent a gas buildup which might block the flow of filtrate. This advantage is realized by providing on housing part 44 at least one venting aperture 52 having disposed thereover a hydrophobic filter element 54. The function of housing part 48 is to prevent structural damage to the filter element 54 through contact with external objects. The hydrophobic filter element 54 prevents the flow of liquids there through but allows the passage of gas, thereby eliminating the danger of an "air lock" in the filter unit. In addition, as pressure increases in the filter unit the hydrophobic filter element 54 will allow the passage of liquid. Thus, the filter 54 acts as a relief valve to insure that pressure within the unit 40 will not increase to the point where element 42 would be ruptured. A particularly preferred hydrophobic filter medium is a polytetrafluoroethylene membrane such as 0.2 micron polytetrafluoroethylene membrane manufactured by W. L. Gore & Associates, Inc., Newark, De. This material will allow the passage of gases but prevent the flow of aqueous solutions up to about 40 psi.

The housing parts 46 and 48 are again provided with an outer portion including an outwardly extending flange having a stepped, cross-sectional configuration to insure adequate bonding and a peripheral recess 56 which prevents lateral movement of the assembled components during the injection molding process.

As mentioned hereinabove, filter units having filter media supports which obstruct the flow of filtrate there through are undesirable since such structures tend to retain gas bubbles in the filter unit which bubbles may subsequently enter the bloodstream with undesirable consequences. Thus, while the filter units 10 and 40 described above have been found acceptable in most respects, the utilization of the ribs 21 as supportive components for the filter element 12 may be undesirable when the filter is used to purify intravenous solutions.

Figures 6, 7, 8:
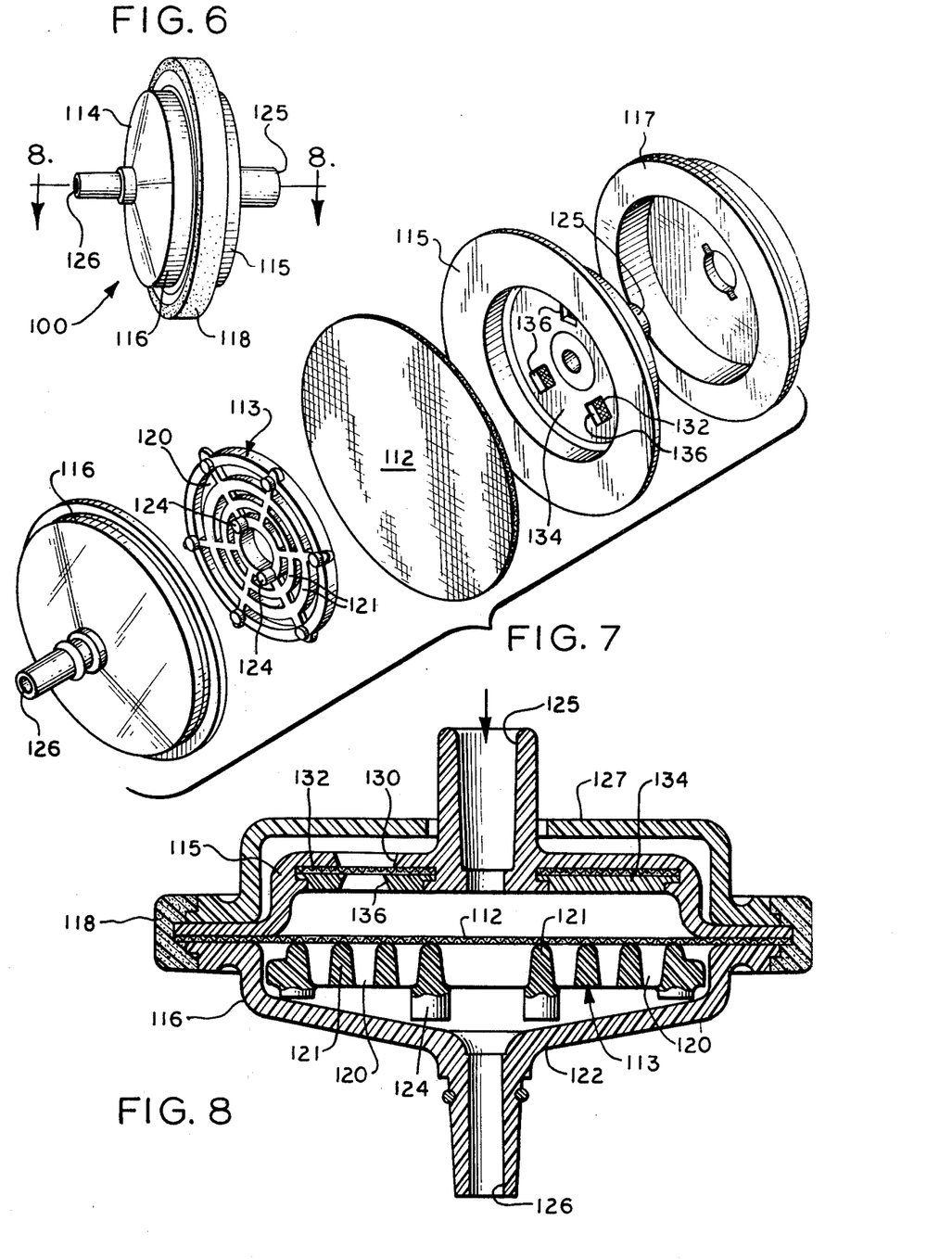
FIG. 6 is a perspective view showing a filter unit having a downstream filter support grid, and venting apertures which may be made by the process of this invention.
FIG. 7 is an exploded perspective view of the component parts of the filter unit shown in FIG. 6 prior to assembly.
FIG. 8 is an enlarged cross-sectional view as taken along lines 8—8 of FIG. 6.

Referring now to FIGS. 6-8 a filter unit 100 is illustrated which incorporates novel features to assure complete purging of downstream gases and which incorporates filtered venting apertures whose filters are sealed by the novel molding process of this invention.

The filter unit 100 includes a filter element 112 and support grid 113 disposed internally of a housing 114 which, in turn, is constructed of two parts, 115 and 116. These components, together with shield 117, are assembled and fused or bonded into an integral filter unit by means of an injection molded sealing member 118 in the same manner as described hereinabove for filter units 10 and 40.

As can be clearly seen in FIGS. 7 and 8, the support grid 113 is disposed within the downstream part 116 of housing 114 in supportive communication with the downstream side of the filter element 112. Support grid 113 includes a plurality of concentric and annular fluid flow passageways 120 separated by concentric walls 121. In addition, the support grid 113 is maintained in spaced relationship with the central recessed portion 122 of the downstream housing part 116 by the pins or legs 124. In this manner, the filtrate passing through filter element 112 may flow substantially free from obstruction into outlet port 126. Moreover, to further minimize the possible entrapment of downstream gases the centrally recessed portion 122 is tapered toward outlet port 126.

As discussed hereinabove in connection with filter unit 40, it is desirable to provide an upstream gas venting means to purge those gases from the filter unit which are introduced with the solution being filtered via inlet port 125. In the embodiment illustrated in FIG. 7 the venting means includes at least one venting aperture 130 in the central recessed portion 127 of inlet housing part 115, the aperture being covered by a hydrophobic, polytetrafluoroethylene filter media 132 which will allow the passage of gases but not liquids within a pressure range of up to 40 psi.

The filter media 132 is disposed by encapsulation within the injection molded inlet part 115, thereby insuring a complete and hermetric seal. Preferably, and in order to assure the structural integrity of the delicate filter media 132 and to facilitate the assembly of the inlet part 115 with the filter media 132, an insert plate 134 is also utilized in supportive communication with the filter media 132 and these two components are both encapsulated within the injection molded inlet part 115. Of course, the plate 134 has apertures 136 which align with each aperture 130 in inlet part 115.

As can be seen in FIG. 7 the apertures 130 and 136 have a noncircular and, preferably, a rectangular configuration. It has been found that due to the small size of these apertures and the range of pressures encountered in use of the filter units, a circular aperture may not vent properly. It is believed that the surface tension of the liquid adjacent these apertures is sufficient to block the free passage of upstream gases there through. Regardless of the actual mechanism, however, it has been unexpectedly found that non-circular apertures function in a manner superior to that of circular venting apertures.

Of course, except for the distinctions set forth herein and illustrated in FIGS. 6–8, the filter unit 100 is in all respects constructed and manufactured in the manner discussed hereinabove for filter units 10 and 40.

Figure 9:
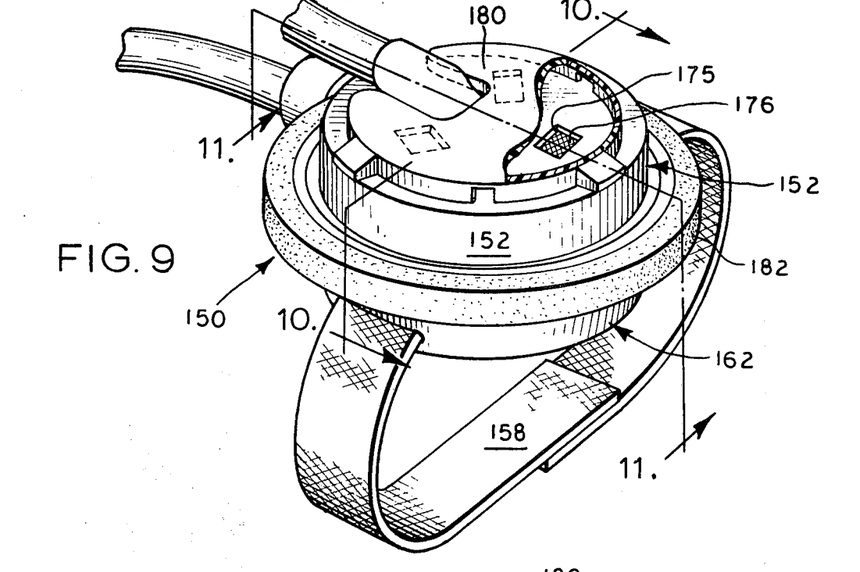
FIGS. 9-11 illustrate another intravenous solution filter unit having its venting aperture constructed in accordance with the process of this invention.
Figure 10:
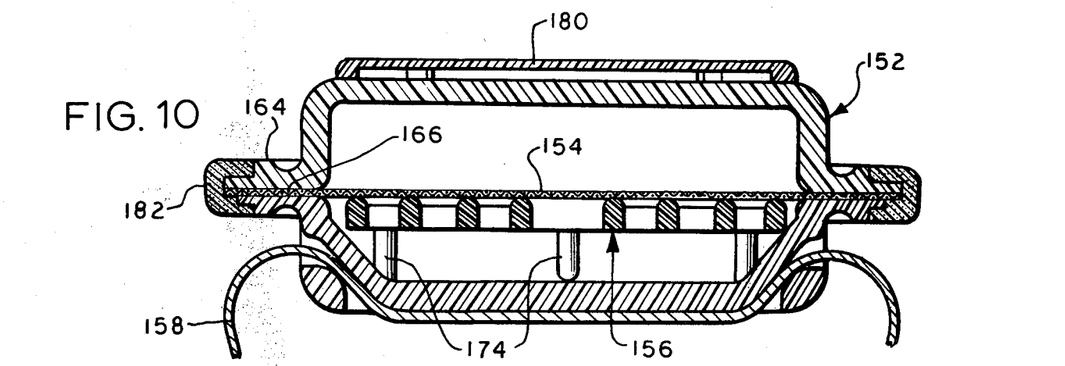
Figure 11:
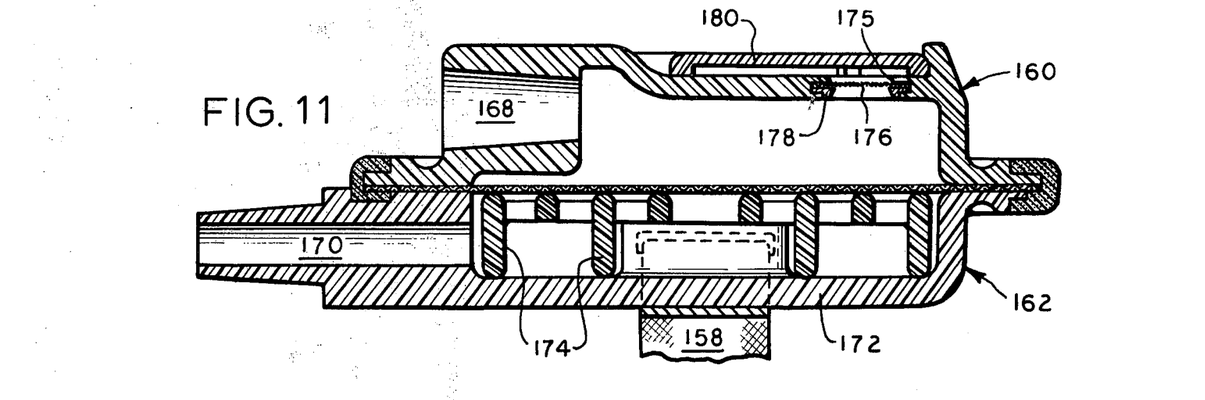

The embodiment of FIGS. 9–11 relates to a filter unit having an arrangement of features which enables the unit to be affixed to the arm or leg of a person being administered to intravenous solution.

The filter unit, designated generally at 150, includes, as do the filter units described previously, a housing 152, a sheet-like porous filter element 154 and a support grid 156. In addition, filter unit 150 also includes mounting means comprising a band 158 made from plastic, adhesive tape, etc. which is connected to housing 152 and adapted to secure the unit to a suitable support, such as a person's wrist or forearm.

The housing 152 includes inlet and outlet parts, 160 and 162 respectively, disposed on opposite sides of the filter element 154, each part having an outer circumferential portion 164 with a mating surface 166 which engages and seals with a peripheral portion of the filter element. The inlet and outlet parts also include respective inlet and outlet ports, 168 and 170, disposed in their lateral walls. In this way the filter unit provides a substantially flat, compact assembly which may be comfortably held in place by the user.

The support grid 156 is constructed and disposed within outlet part 162 in the manner disclosed hereinabove with respect to filter unit 100. It is to be noted that in this filter, as in filter 100, the support grid 156 is spaced from wall 172 of outlet part 162, as by legs 174, to provide a substantially unobstructed flow passageway which, in turn, assures the complete purging of downstream gases from the unit. Similarly, the upstream gases may be purged via a venting means which includes an aperture 175, a hydrophobic filter element 176, an insert plate 178 and a shield 180 and which functions as does the similar structural arrangement in filter unit 100.

The inlet and outlet housing parts, filter element and support grid of filter unit 150 are assembled and joined into an integral unit by sealing member 182 in the same manner as described above.

Figure 12:
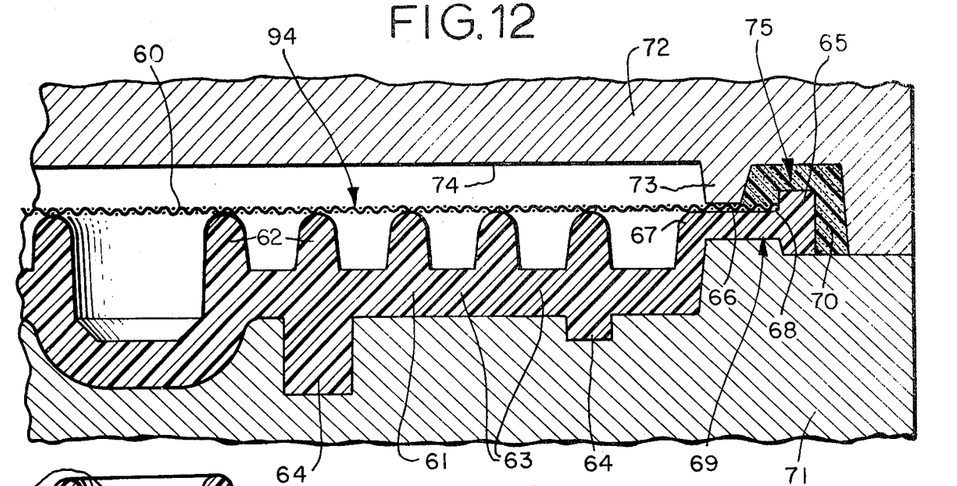
FIG. 12 is an enlarged partial cross-sectional view showing the manner in which the edges of the main filter element in an intravenous filter unit may be overmolded to form a sealed, integral unit with the downstream support grid.
Figure 13:
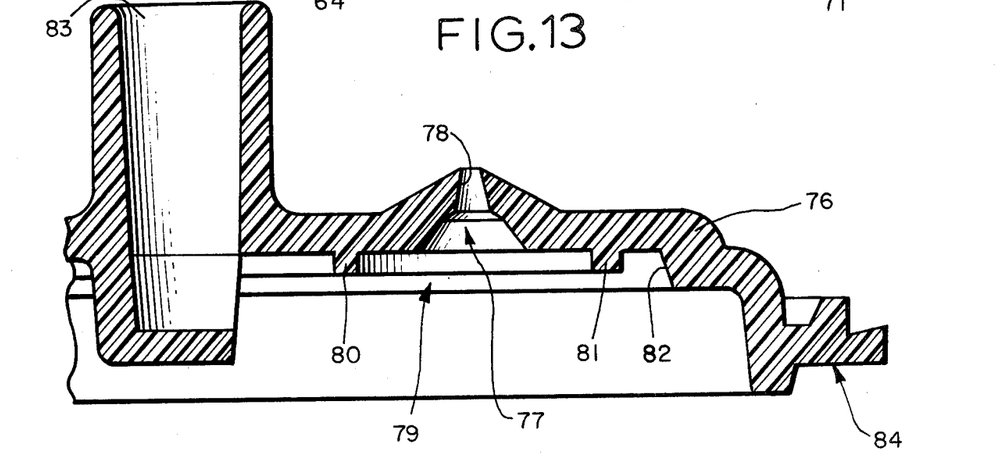
FIG. 13 is an enlarged partial cross-sectional view showing a vent aperture support member similar to the one shown in FIG. 8.
Figure 14:
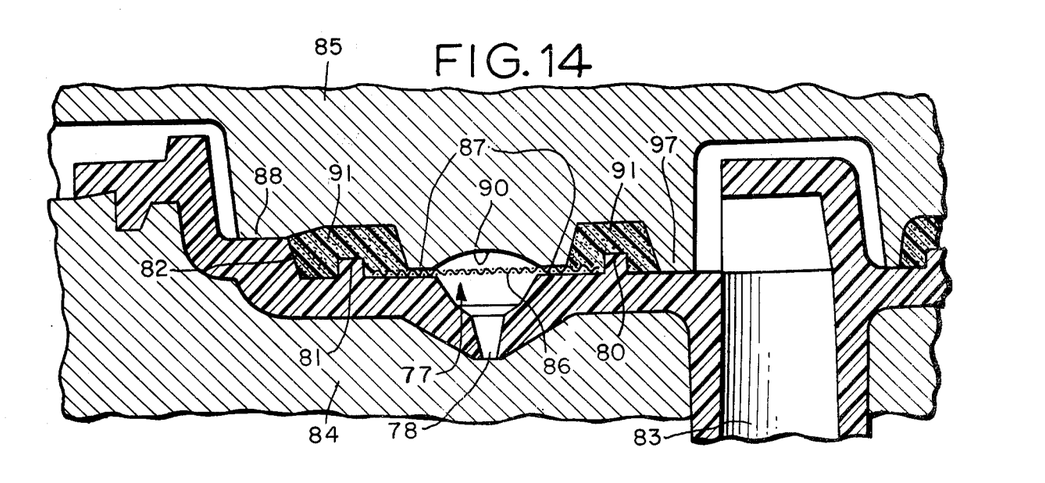
FIG. 14 is an enlarged partial cross-sectional view showing the manner in which the edges of a vent aperture filter element may be overmolded to form a sealed, integral unit with the vent aperture support member of FIG. 13.
Figures 15, 16:
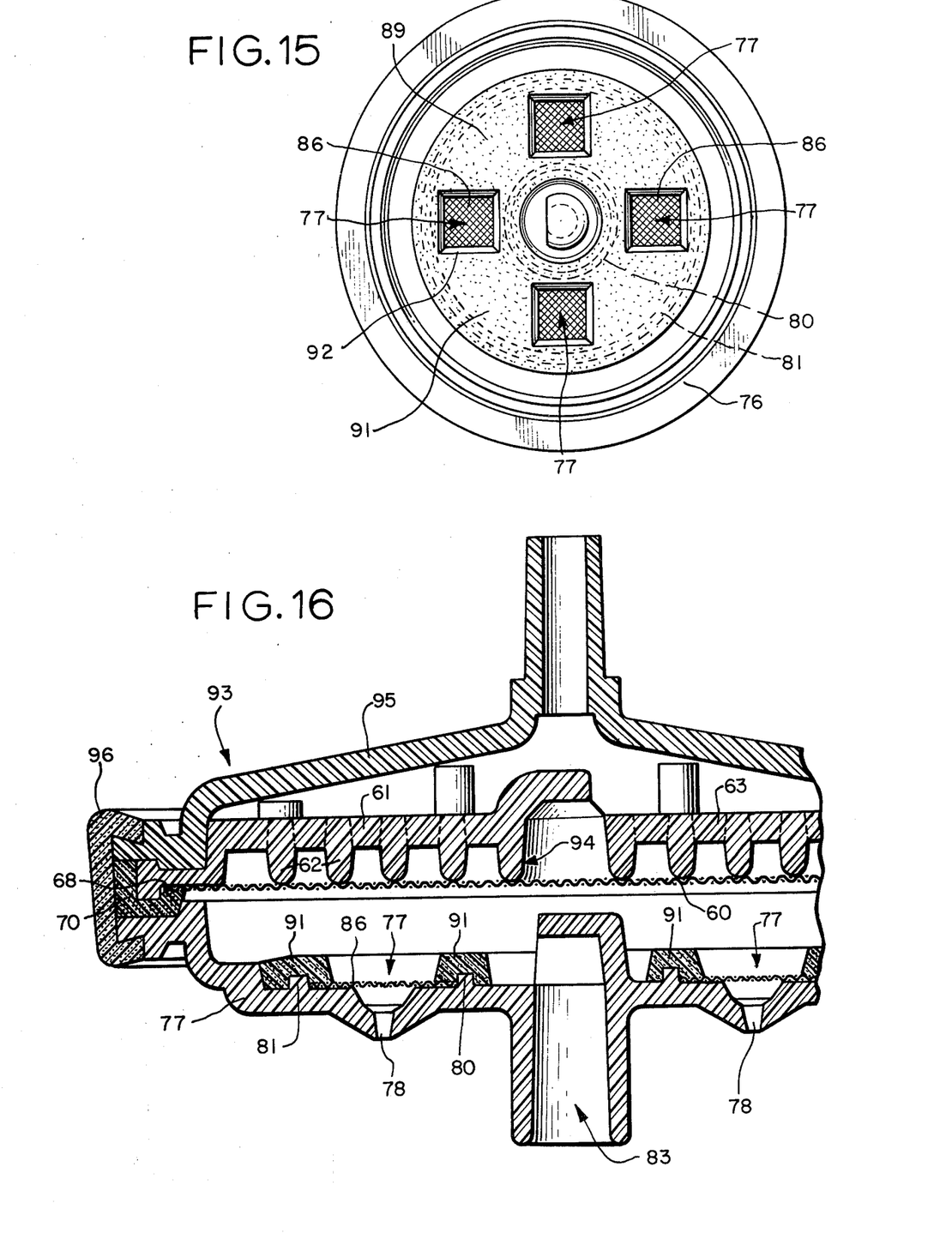
FIG. 15 is an enlarged view of the vent aperture housing member of FIG. 13 showing the overmolded and open areas.
FIG. 16 is an enlarged partial cross-sectional view showing the features of the fully assembled filter unit.

FIGS. 12 through 16 most clearly illustrate the molding process of this invention and the novel filter units produced thereby. FIG. 12 illustrates the manner in which the edges of a main filter element 60 may be overmolded to from a sealed unit with its downstream support grid 61. FIGS. 13 through 15 illustrate the manner in which the vent aperture filter in an intravenous solution filter unit may be overmolded to form a sealed integral unit with the vent aperture support member. FIG. 16 illustrates the assembled filter unit.

Referring now to FIG. 12, a portion of a circular filter support grid 61 is shown between the two halves 71, 72 of a mold. Filter support grid 61 is similar in function and structure to grid 113 of FIGS. 7 and 8, except that grid 61 is designed to form a sealed unit which circular filter 60 and is molded into the final assembled filter unit, whereas the filter 112 in FIGS. 7 and 8 is simply placed between the parts 115 and 116 of the housing to support a filter which is sealed between the housing parts. Thus, grid 61 is provided with a plurality of concentric and annular fluid flow passages separated by concentric walls 62. Concentric walls 62 are tied together by a series of radially extending supports 63. Grid 61 also is provided with legs 64 which maintain the grid in a spaced relation with the central recessed portion of the downstream housing part. The outer edge or rim 64 of grid 61 is provided with a raised tab 65 or locating ring at its outer perimeter and with a shelf 66, located between the outermost concentric wall 67 and ring 65, of the same elevation as the upper ends of walls 62, 67.

In one embodiment of the process of this invention, grid 61 is molded between lower mold half 71 and a compatible upper mold half (not shown) which forms the upper features of the grid. After the grid has cooled sufficiently, the upper mold half is removed and filter element 60 is placed over the concentric walls 62, 67 and shelf 66 with proper alignment being effected by locating ring 65. Then, upper mold half 72 is placed over lower mold half 71, grid 61 and filter element 60 and pressure is applied to seal the mold. Upper mold half 72 is provided with a pinch off portion 73 which applies pressure to filter 60 where it rests on shelf 66, just inside its peripheral edge 68, to firmly hold filter 60 in place on the grid 61 and to seal off the peripheral edge 68 from the portion of the filter which extends over the fluid flow passageways. Mold 72 is otherwise recessed over the filter (as at 74) to reduce possible damage to the delicate filter membrane.

When mold 72 is in place, mold halves 71 and 72 and the rim 69 of grid 61 form an annular channel 75 around the periphery 68 of filter element 60. A thermoplastic resin 70 compatible with filter element 60 and the resin used for the support grid 61 is injection molded into channel 75 to overmold the peripheral edge 68 of filter element 61 and the locating ring 65 and adjacent portions of rim 69 of grid 61, so that the filter element 60 is captured in the plastic and an integral seal is formed between the filter element 60, the grid 61 and the compatible resin 70. After the overmolded resin has cooled sufficiently, the mold halves are separated and the integral filter-support grid 94 assembly is ejected.

As shown in FIGS. 8 and 11, the filter sealing process of this invention may also be employed to seal venting aperture filters. The method by which this may be accomplished is most clearly shown in FIGS. 13 through 15.

Referring now to FIG. 13, a circular filter housing part 76 is shown in partial cross-section which is provided with tapered venting apertures 77 having outlet openings 78 (See FIG. 16.) On the filter side 79 of the apertures 77, inner and outer concentric locating rings 80 and 81, which are set back from the inside of the aperture, are provided to aid in properly aligning the filter. The part 76 is provided with a stepped portion 82 to aid in the subsequent overmolding. Part 76 is also provided with an inlet port 83, and it has a peripheral stepped cross-sectional configuration 84 which aids in the sealing of the part with the other housing part of the filter unit.

Referring now to FIG. 14, part 76 is molded between lower mold half 84 and a compatable upper mold half (not shown) which forms the features on the inner side of the part. After the part has cooled sufficiently, the upper mold half is removed and an annular filter element 86 is placed between the inner and outer concentric locating rings 80 and 81. Then, upper mold half 85 is placed over the lower mold half 84, the part 76 and filter element 86, and pressure is applied to seal the mold. Upper mold half 85 is provided with pinch off portions 87 which apply pressure to filter 86 around all sides of aperture 77 to firmly hold filter 86 against part 76 and to seal off the portion of the filter which extends over the aperture. Mold half 85 is also provided with inner and outer circular sealing portions 97, 88 which define an annular area 89 therebetween. Mold half 85 is recessed at 90 over the apertures 77 to reduce possible damage to the delicate filter membrane.

A thermoplastic resin 91 is then injection molded into the annular area 89, filling the entire area 89, except for the portion of area 89 over the apertures 77, which are sealed by pinch off portions 87. As noted above, the inner open ends 92 of the apertures 77 are most advantageously rectangular. This overmolded resin 91 thus captures the edges of the filter 86 between the layers of resin and forms an integral seal between the filter element 86 and the supporting housing part 76.

Referring now to FIG. 16, there is shown a partial cross-sectional view of the final assembled filter unit 93. Filter unit 93 is provided with the integral filter-support grid 94 which is sandwiched between the two parts 77, 95 of the filter housing. To insure a leakproof outer seal, the peripheries of filter-support grid 94, and housing parts 77, 95 are provided with compatable and interlocking stepped cross-sectional configurations and are sealed with a thermoplastic resin 96, in the same manner as described hereinabove for filter units 10, 40 and 100.

The seal formed by the process of this invention is superior to those achieved through the use of prior art processes as it significantly reduces susceptibility to filter leakage, both by effectively sealing the filter to a thermoplastic support surrounding the aperture and by reducing possible damage to the portion of the delicate filter which spans the aperture. The process of this invention is particularly suited for the sealing of difficult to adhere membranes such as the porous polytetrafluouroethylenes and delicate membranes such as the unsupported cellusosics, eg., the celluose-acetate and celluose-nitrate based membranes.

It should also be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A method for hermetically sealing a filter element, comprising:
   molding a thermoplastic support for the filter element, said support having formed therein a fluid flow passageway;
   aligning the filter element over the passageway and the adjacent surface portions of the support;
   applying pressure to the filter element between the edge of the passageway and the periphery of the element, where the element is disposed over a surface portion of the support, to hold the filter element in position on the support; and
   injection molding a compatible thermoplastic overmold over the periphery of the element and the adjacent surface portions of the support to capture the periphery of the filter element against the support and to form an integral seal between the support and the filter element.

2. The method of claim 1, wherein the support is provided with a tab for aligning the filter, which tab forms a portion of the surface portions of the support which is overmolded.

3. The method of claim 1, wherein one common mold half is utilized for molding the support and for injection molding the thermoplastic overmold.

4. A method for hermetically sealing a filter element, comprising:
   molding a thermoplastic support for the filter element between two mold halves, said support having at least one aperture for the passage of a fluid;
   removing one of the mold halves to expose the surface of the support on which the filter is to be located;
   aligning the filter element over the aperture and the adjacent surface portions of the support;
   placing a new mold half over the support, the filter element and the remaining original mold half, the new mold half having portions which contact and apply pressure to the filter element near the edge of the aperture, the new mold half and the support forming a channel along the periphery of the filter element;
   injection molding a compatible thermoplastic material into the channel to capture the periphery of the filter element against the support and to form an integral seal between the support, the filter element and the compatible thermoplastic material; and
   separating the mold halves and ejecting the support and its integral filter element.

5. The method of claim 4, wherein the support is provided with an aligning tab for aligning the filter, which tab forms a portion of support which is overmolded.

6. A method for hermetically sealing a filter element, comprising:
   molding a thermoplastic support for the filter element between lower and upper mold halves, said support having at least one aperture for the passage of a fluid, said aperture surrounded, on the filter side, by a flat rim;
   removing the upper half of the mold to expose the support and its rim;
   inserting the filter element over the aperture and the rim;
   placing a second upper mold half over the lower mold half, the support and the filter element, the second upper mold half having portions which contact and apply pressure to the filter element between the periphery of the element and the portion of the element above the aperture, where the filter element rests on the rim, the second upper mold half and the support forming a channel around the periphery of the filter element and the adjacent portion of the support, the portion of the upper mold half positioned over the aperture being partially cut back so that the second upper mold half does not contact the portion of the filter element above the aperture;
   injection molding a compatible thermoplastic material into the channel to form an integral seal between the support, the filter element and the compatible thermoplastic material; and
   removing the second upper mold half and ejecting the support.

7. A filter assembly for a filter unit for removing bacteria and other contaminants from a fluid stream, comprising:

a thermoplastic support member, a porous filter element and a thermoplastic overmold member;

said thermoplastic support member having at least one fluid flow passageway, at least one filter aligning tab, and a flat shelf between the passageway and the aligning tab, said shelf surrounding the passageway;

said filter element extending over the passageway, its outer portion resting on the shelf with the periphery of said filter element disposed adjacent to the aligning tab; and said thermoplastic overmold member disposed over the periphery of said filter element and over the aligning tab to seal the periphery of the filter element to the support.

8. The filter assembly of claim 7, wherein the thermoplastic support member is a circular grid having a plurality of concentric annular fluid flow passageways and a plurality of raised ribs, said aligning tab and said shelf are annular, said filter element is supported by the raised ribs and the shelf, and said raised ribs and said shelf have the same elevation.

9. The filter assembly of claim 7, wherein the thermoplastic support member is a filter housing part, there are two or more fluid flow passageways, said passageways being venting apertures, there are two annular aligning tabs, the filter element is annular, and the overmold member forms rectangular entryways to the venting apertures.

10. A filter unit for removing bacteria and other contaminants from a fluid stream, comprising:

a thermoplastic circular filter support grid, the grid having a plurality of concentric annular fluid flow passageways separated from one another by a plurality of annular ribs, a flat rim surrounding the outermost passageway on the same side of the grid as the ribs, and a raised locating ring surrounding the rim, the rim and the tops of the ribs having the same elevation, the ring having an elevation higher than the rim;

a flat, circular, sheet-like, porous, filter element disposed over the passageways, the ribs and the rim, with the peripheral portion of the filter element resting on the rim, with the edge of the filter element disposed adjacent to the locating ring;

a first thermoplastic overmold member formed over the outer portion of the filter element resting on the rim and over the locating ring, to seal the entire edge of the filter element into the support;

a first cup shaped housing part including a recessed central portion having an axially disposed inlet port and at least two venting apertures, said venting apertures disposed at the same distance from the axis of the part, between inner and outer locating rings, said part including a flat, annular, sheet-like, porous, venting filter element disposed between the inner and outer rings and a second thermoplastic overmold member formed over the inner and outer peripheral edges of the venting filter element and over the inner and outer rings to seal the edges of the filter against the support;

a second cup shaped housing part including a recessed central portion having an axially disposed outlet port;

the support grid being disposed between the first and second housing parts with the sealed in filter element positioned on the first housing part side of the grid;

the support grid and the housing parts having compatible, interlocking annular peripheral portions sealed by an annular sealing member.

11. The filter unit of claim 10, wherein the central recessed portion of the second housing part is tapered toward the outlet port, the central portion of the support grid is disposed within the recessed portion of the second housing part and is spaced from the tapered portions of the housing part to provide a substantially unobstructed fluid flow passageway to the outlet port.

12. The filter unit of claim 11, wherein the second overmold member covers the entire annular area between the inner and outer rings on the first housing part save for an opening positioned immediately above each venting aperture, said openings in the second overmold member having a non-circular shape.

13. A method for hermetically sealing a filter element, comprising:

molding a thermoplastic support for the filter element between two mold halves, said support having a flat rim to support the outer portion of the filter element and at least one fluid flow passageway positioned inwardly of the rim;

removing one of the mold halves to expose the rim and the end of the passageway over which the filter is to be placed;

aligning the filter element over the passageway and the rim;

placing a new mold half over the support, the filter element and the remaining filter support mold half, the new mold half having portions which contact and apply pressure to a circumferential portion of the filter element resting on the rim, said circumferential portion being inward of the periphery of the filter element; and injection molding a compatible thermoplastic overmold over the periphery of the filter element and the adjacent surface portions of the support to capture the periphery of the filter against the support and to form an integral seal between the support, the filter element and the compatible thermoplastic material.

* * * * *